(12) United States Patent
Holland

(10) Patent No.: US 7,599,397 B2
(45) Date of Patent: Oct. 6, 2009

(54) OBTAINING MULTIPLE PORT ADDRESSES BY A FIBRE CHANNEL SWITCH FROM A NETWORK FABRIC

(75) Inventor: William G. Holland, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 11/318,971

(22) Filed: Dec. 27, 2005

(65) Prior Publication Data
US 2007/0147267 A1 Jun. 28, 2007

(51) Int. Cl.
*H04L 12/26* (2006.01)
(52) U.S. Cl. .................................................... 370/475
(58) Field of Classification Search ................. 370/475
See application file for complete search history.

(56) References Cited

U.S. PATENT DOCUMENTS

| | | | |
|---|---|---|---|
| 6,807,579 B1 | 10/2004 | Frazier | |
| 6,941,260 B2 | 9/2005 | Emberty et al. | |
| 2002/0194294 A1 | 12/2002 | Blumenau et al. | |
| 2004/0151188 A1 | 8/2004 | Maveli et al. | |
| 2005/0114476 A1 | 5/2005 | Chen et al. | |

OTHER PUBLICATIONS

IBM Technical Disclosure Bulletin 11-94, ol. 37, No. 11, pp. 641-645; *Hybrid Switch Control Scheme for Fast Point-to-Point/Multicast/Hunt-Group Connection Setup* Nov. 1994.

*Primary Examiner*—Melvin Marcelo
(74) *Attorney, Agent, or Firm*—Steven M. Greenberg, Esq.; Cynthia S. Seal, Esq.; Carey, Rodriguez, Greenberg & Paul, LLP

(57) ABSTRACT

Embodiments of the present invention address deficiencies of the art in respect to Fibre Channel (FC) switch interoperability and provide a novel and non-obvious data processing system, method and computer program product for obtaining multiple port addresses by a FC switch directly from a SAN fabric. In one embodiment, the system uses an N_Port connection from the last tier FC SAN switch to connect to the rest of the SAN fabric and employs the N_Port ID Virtualization (NPIV) Fibre Channel feature. The NPIV feature allows one physical FC port (N_Port) to login to a SAN fabric multiple times and receive unique N_Port IDs with each login. This allows the one physical FC port (N_Port) to act as multiple logical N_Ports.

13 Claims, 3 Drawing Sheets

OBTAINING MULTIPLE PORT ADDRESSES BY A FIBRE CHANNEL SWITCH FROM A NETWORK FABRIC

BACKGROUND OF THE INVENTION

1. Field of the Invention

The present invention relates to data communications and more particularly to a Fibre Channel (FC) switch.

2. Description of the Related Art

Fibre Channel (FC) switches are used to connect servers to storage services and resources, for creating a storage area network (SAN). In computing, a storage area network (SAN) is a network designed to attach computer storage devices such as disk array controllers and tape libraries to servers. The SAN fabric is an active intelligent interconnection scheme that utilizes the Fibre Channel Architecture. Servers and storage devices connect to FC SAN switches as an N_Port (node port), while the switch provides an F_Port (fabric port). When two FC SAN switches are connected together to enlarge the switch fabric, they will utilize an unique port type, an E-Port on each end. E_Ports implement a unique mechanism to exchange configuration and topology information between the switches.

When the E_Ports of two switches support the same configuration and protocol parameters, they will establish an inter-switch link (ISL) between the two switches. In contrast, when the E_Ports of two switches do not support the same configuration and protocol parameters, or when there are other incompatible factors between the two switches, no ISL link will be established. There is no method for directly connecting switches that do not share a common ISL protocol. The industry standard for ISLs is defined in the T11 FC-SW-2 standard. Currently each FC switch vendor provides various extensions to the basic FC architecture in order to provide value added capabilities to their switches. These vendor-provided extensions cause these switches to be unable to establish a link with switches that do not support the same set of extensions. This lack of interoperability between dissimilar FC switches is a major impediment to deploying new FC technology into existing SANs.

ISLs established through E_Ports, as described above, have additional unique properties related to maintaining a consistent view of the fabric and the various devices among all the interconnected SAN switches. Any device with an E_Port connection to the SAN is a peer with all the switches, which are collectively managing and controlling the SAN itself. An alteration of an E_Port link will disrupt the SAN fabric management structure, and consequently can cause a momentary disruption across the entire SAN, while the interconnected switches re-establish the management hierarchy and restore the switch to switch communications. Accordingly, inter-switch links expose the SAN to disruptions from events that would be trivial if occurring on a normal device link (e.g., N_Port). For example, the routing tables must be changed in all switches within the fabric when any E_Port connection is altered.

Another problem associated with inter-switch links is management security risk. As all switches are peers in the management of the SAN, management control of any single switch on the SAN will provide management control of the entire SAN. The Inter-switch links extend the SAN, as well as the risk of unwanted SAN management access, to every connected switch in the fabric. Consequently, there is no way to aggregate server or device FC connections directly from one FC switch to another without extending the security risk as well.

Potential solutions are to enforce a homogeneous SAN switch environment or insert a "router" function between the SANs. The SAN can remain homogeneous by deploying only one vendor's switch product or requiring all FC switches in the SAN to operate in a standard mode (e.g., FC-SW-2 mode). However, changing to the FC-SW-2 mode (also known as open mode) is disruptive to the SAN, requires operational changes to the management of the SAN and disables features that can be selected and used in the vendor's private extensions. Inserting a router between two switches introduces a performance characteristic that can lead to performance and scalability limitations. Each message crossing the SAN must be interrogated, and if appropriate, retransmitted to the other SAN segments. The equipment necessary to perform this task remains expensive for the performance levels needed in a large SAN.

In addition, the management of the storage environment is divided at a router. The storage devices and servers on one side of the router cannot see the storage devices and servers on the other side through the router; instead each can only see the router. The router itself must then be explicitly configured and managed in order to make the proper devices visible across the router, to pass the proper traffic across the router, and to map resource addresses from one side to the other. This is similar to a network router performing Network Address Translation (NAT). It is therefore desirable to have a system and method that minimizes switch interoperability impediments, management control risks, and management control points, while still providing access for multiple servers to access the SAN through a single physical port connection.

BRIEF SUMMARY OF THE INVENTION

Embodiments of the present invention address the deficiencies of the art in respect to FC switch interoperability and provide a novel and non-obvious data processing system, method and computer program product for obtaining multiple port addresses by a FC switch directly from a SAN fabric. In one embodiment, the system uses an N_Port connection from the last tier FC SAN switch to connect to the rest of the SAN fabric and employs the N_Port ID Virtualization (NPIV) Fibre Channel feature. The NPIV feature allows one physical FC port (N_Port) to login to a SAN fabric multiple times and receive unique N_Port IDs with each login. This allows the one physical FC port (N_Port) to act as multiple logical N_Ports.

According to an aspect of the embodiment, a data processing system can provide data communication between multiple data processing devices (e.g., servers, switches, storage devices and the like). A server chassis further can be provided which can include a plurality of server computing devices coupled to a SAN fabric by a fibre channel switch disposed between the server computing devices and the fabric. The fabric can be an active intelligent interconnection scheme for fibre channel architecture. The switch can include a node port for interconnection to a fabric port of the fabric, and request handling logic that can be program code enabled to send multiple requests to the fabric on behalf of respective ones of the plurality of server devices. The fabric can be coupled to a table configured for storing the address identifications.

According to another aspect of the embodiment, a method for address assignment for a switch can include transmitting a request from a switch to a fabric, the request on behalf of a server computing device where the switch includes a node port for interconnection to a fabric port of the fabric and receiving an assigned address identification for the request from the fabric. The method can further include transmitting a proposed address to the fabric along with the request and receiving confirmation from the switch that the proposed address has been assigned to the server computing device.

Additional aspects of the invention will be set forth in part in the description which follows, and in part will be obvious from the description, or can be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention provides a data processing system, method and computer program product for obtaining multiple port addresses by a FC switch directly from a SAN fabric. The invention provides a FC Switch Module configured to provide an interface between multiple servers and a SAN fabric. The FC Switch Module provides "NPIV port" mode support and connects to the SAN fabric as an N_Port to establish port identification (N_Port IDs) for itself, if desired, and for each Host Bus Adaptor (HBA) port that connects to the FC Switch Module on behalf of a server.

The fabric can provide support for NPIV connected servers, as is know in the art. That support is sufficient for the fabric to support this new "NPIV port" mode from the FC Switch Module.

Figure 1:
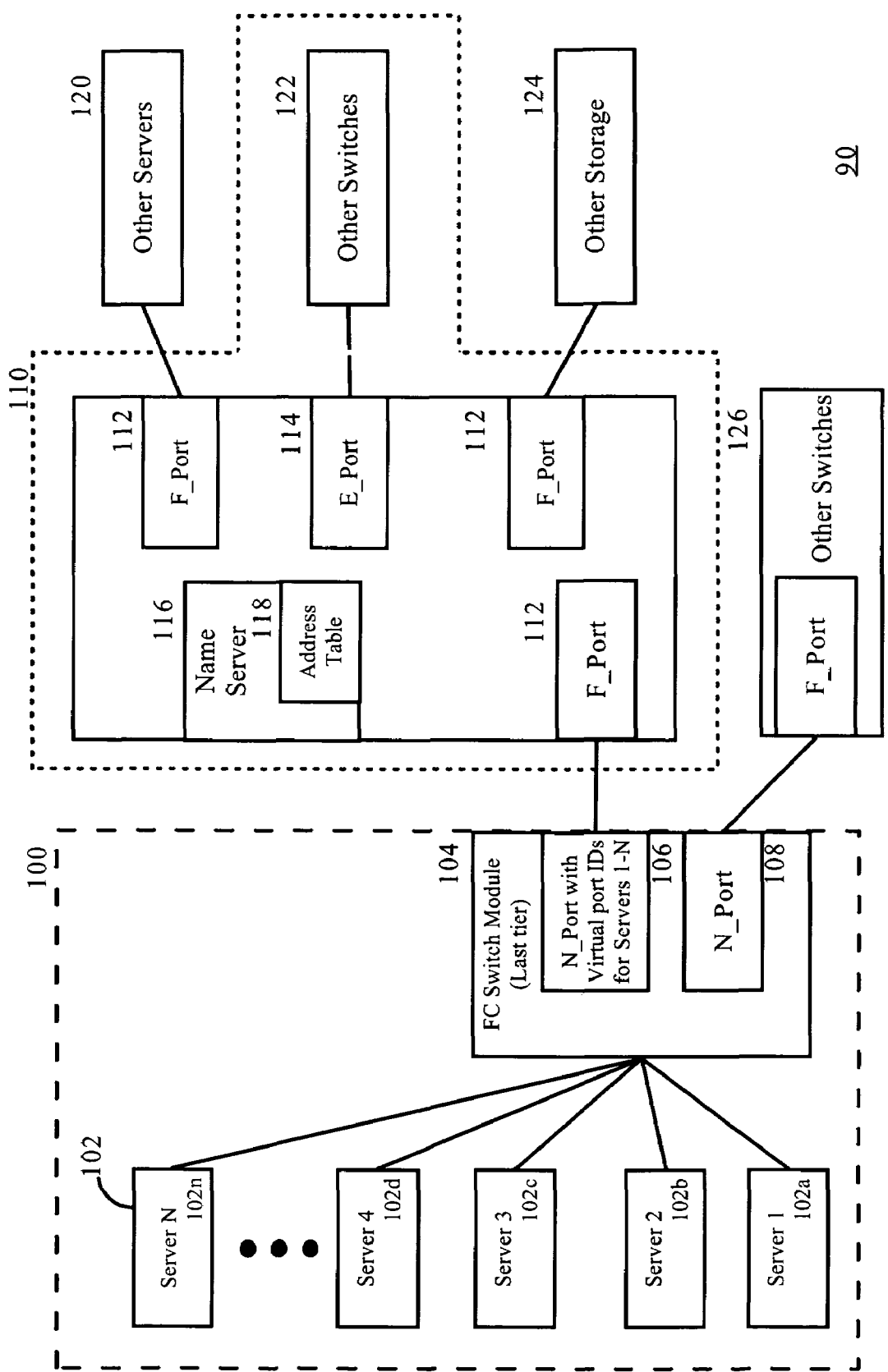
FIG. 1 is a block diagram illustrating a data communications network configured with an FC Switch programmed to obtain multiple port identifications directly from a SAN fabric.

In illustration, FIG. 1 is a block diagram illustrating a data communications network configured with an FC Switch Module programmed to obtain multiple port identifications (N_Port ID) directly from a SAN fabric. As shown in FIG. 1 a data processing network 90 can include a server chassis 100 which can be, for instance, a BladeCenter™ Server Chassis manufactured by International Business Machines Corporation of Armonk, N.Y., United States. The server chassis 100 can include multiple server computing devices 102a-102n and a FC Switch Module 104, however, the multiple server computing devices 102a-102n and the FC Switch Module 104 can be standalone system components and reside outside the server chassis 100 either separately or in combination.

Each server 102 communicates with the FC Switch Module 104 through host bus adapters, for instance a blade HBA, as it is well known, and is connected to the FC Fabric 110 by the FC Switch Module 104 with the FC Fabric 110 being connected to one or more other network devices, for example other servers 120, other switches 122 and other storage 124. Optionally, the FC Switch Module 104 can also connect, even simultaneously, via another external port 108 to the same fabric, or to another fabric, network device, or FC switch 126. Each port on the FC Switch Module can be configured to use NPIV port mode, or not. Optionally, the servers 102 may be allowed to access all connected FC devices, or may be configured to limit access to specific devices or through specific ports. The connection and sending of data between the multiple servers 102, the fabric 110, and the other network devices 120, 122, 124 can be, for instance, as described in proposed standard Fibre Channel Framing and Signaling (FC-FS Rev. 1.90) NCITS Project 1331-D, Apr. 9, 2003.

The FC Switch Module 104 is, in the exemplary embodiment, hardware having a software interface for communicating with the multiple servers 102, and includes an N_Port 106 for connecting to an F_Port 112 of the fabric 110. Although a single port, the N_Port 106 recognizes multiple addresses (N_Port IDs), for example, one address for each of the servers 1-n (102a-102n). Once the N_port ID address for a server 102 is established, communication by another network device (e.g., other servers 120, other switches 122, other storage 124, etc.) to that particular server 102 can be effected by communicating with the server's assigned N_Port ID address. A name server 114 is provided in the fabric 110 that includes an address table 116.

This address table includes, among other things, an identification of each server 102, for instance its World Wide Name (WWN), and its corresponding N_Port ID address. Thus, in order to communicate with a server 102, the name server 114 can be accessed to determine the N_Port ID address corresponding to that server 102, and data is then sent to that N_Port ID address. It will be understood that each F_Port 112 in the fabric 110 acts to receive and transmit data and commands between the fabric 110 and the FC Switch Module 104 or a network device (e.g., other servers 120, other switches 122, other storage 124, etc.), as is known in the art.

The FC Switch Module provides an N_Port ID Virtualization "NPIV" mode support which allows a physical FC port (N_Port) to log into a SAN fabric multiple times, and to receive a unique N_Port ID each time. Accordingly, the physical FC Switch Module port (N_Port) can act as multiple logical N_Ports. More specifically, NPIV provides an operational mode for an external port of a FC switch that will allow it to connect to a SAN fabric as a node port (N_Port), and to establish virtual ports (N_Port IDs) for itself and for each server computing device, for instance, servers 102 or the corresponding host bus adapter (HBA), that connects to the FC Switch Module. The connected fabric port 112 can provide NPIV support in the form of a login response mechanism that provides multiple N_Port IDs in response to multiple requests. When utilizing NPIV, only the interconnected node port (N_Port) of the FC Switch Module 104 and fabric port (F_Port) of the fabric 110 will have any awareness of the virtualization occurring.

Figure 2:
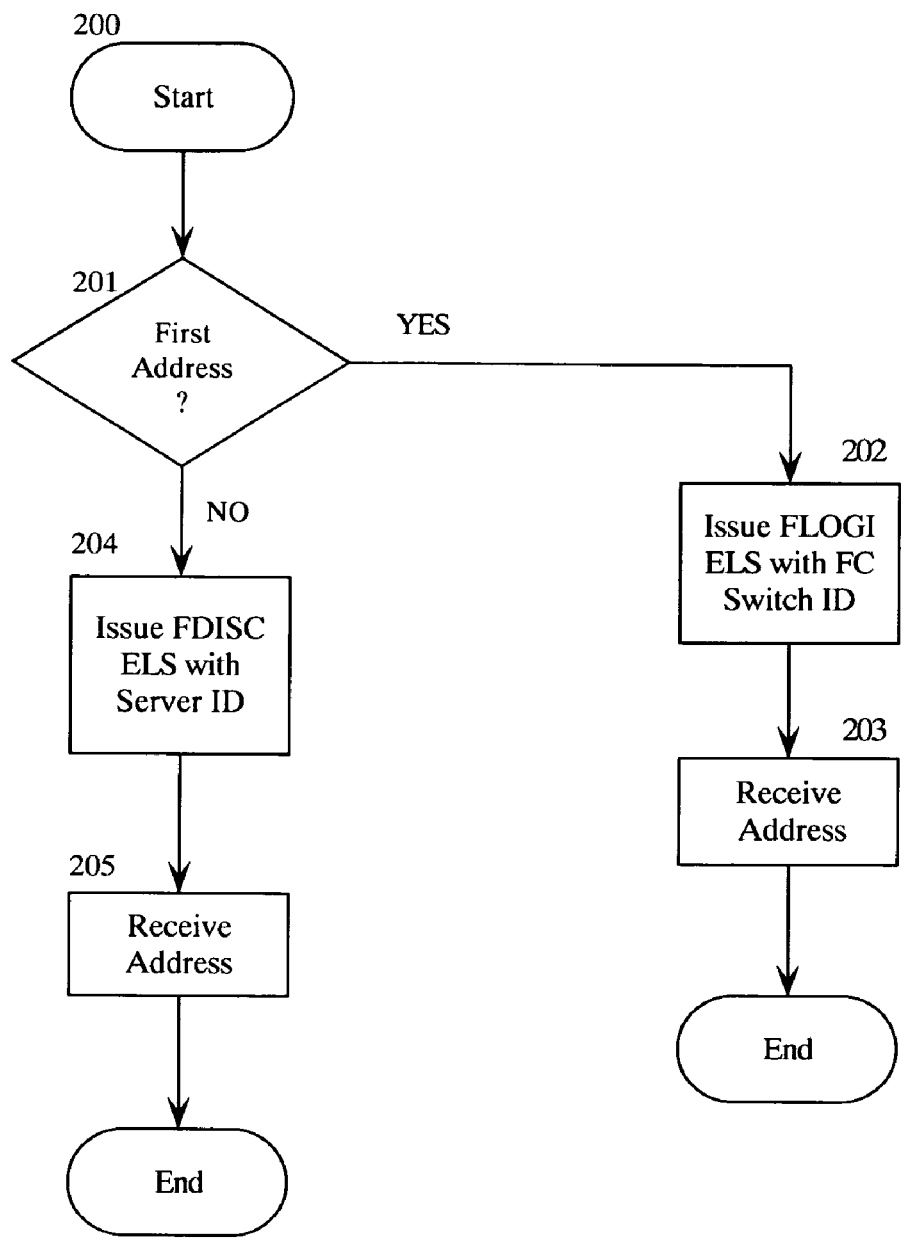
FIG. 2 is a flow chart illustrating a process for a FC Switch Module to request a node address (N_Port ID) from the network fabric.

In further illustration, FIG. 2 is a flow chart illustrating a process which can be used by the FC Switch Module port 106 for obtaining an N_Port address from the fabric 110. The procedure starts at Block 200. If at Block 201, this is the first address for the N_Port 106, a Fabric Login Extended Link Service (FLOGI ELS) command is issued to the fabric 110. In an embodiment, the FLOGI ELS command includes identification for the FC Switch Module 104 requesting the address, and has a source address of all zeros to indicate to the fabric 110 that an N_Port address identifier is being requested. This allows the FC Switch Module 104 to obtain the first logical port address for itself. At Block 203, the address assigned by the fabric 110 is received. Alternatively, the FC Switch Module may not need an N_Port ID address, and then, the FLOGI command can be sent on behalf of the first server 102 that issued a login (FLOGI) request to the FC Switch Module requesting an N_Port ID address. This first request can always be assigned by a selected one of the servers, or can be the first server needing an address, or can be selected by, for instance, a round robin scheme, as can be desired.

If this is not the first address being selected for a FC Switch Module 104, a first address having already been obtained, at Block 204, a Fabric Discovery Extended Link Service (FDISC ELS) command with a server 102 identification is issued using either the source address identifier of zero, or, if known, the new source address identifier using identical service parameters as provided in the original FLOGI command of the FC Switch Module 104 to the fabric 110. At Block 205, the N_Port 106 receives the address assigned or confirmed by the fabric 110 for use with the server 102 upon whose behalf the request was made.

Figure 3:
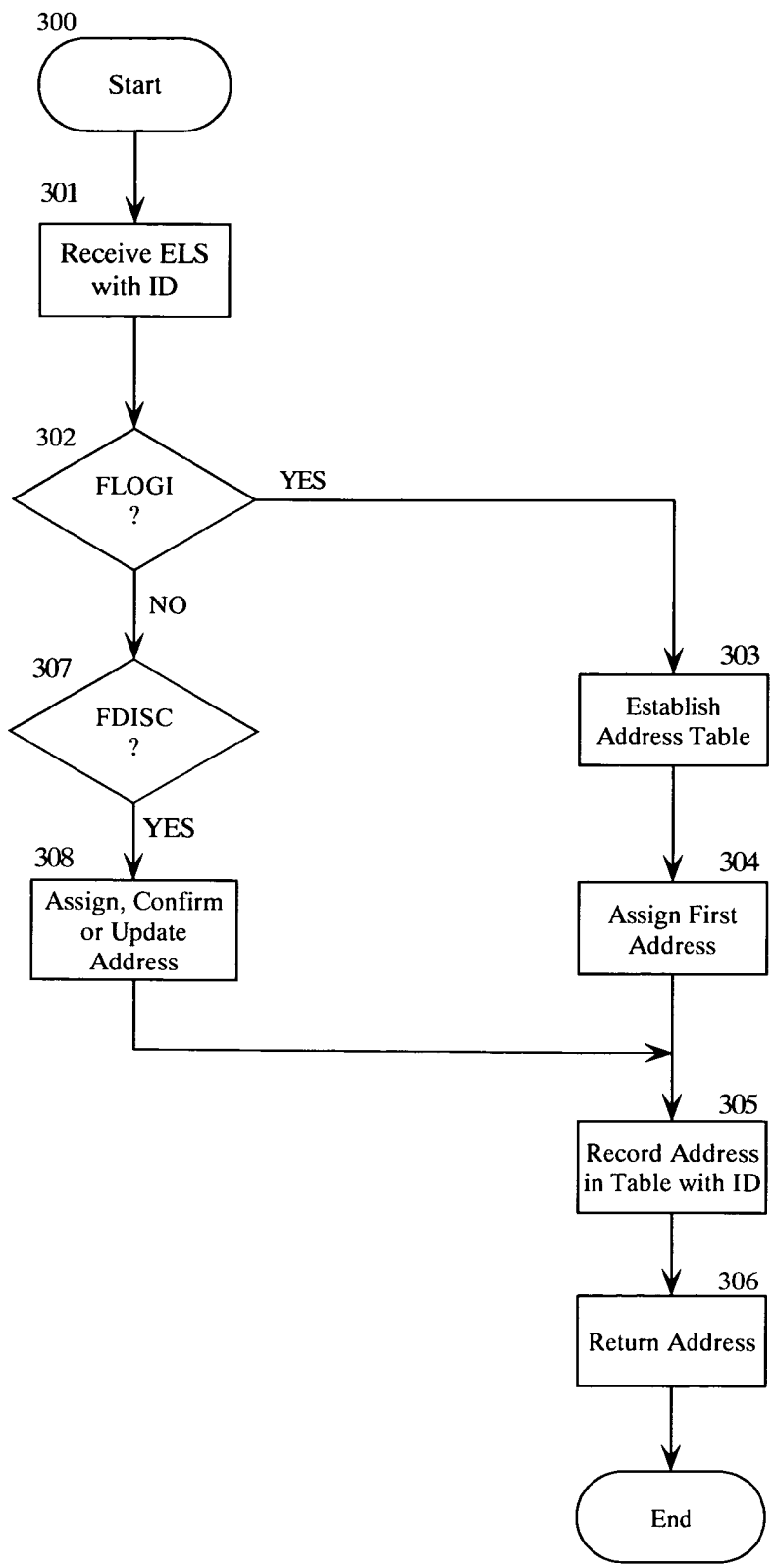
FIG. 3 is a flow chart illustrating a process for the fabric to respond to a request from a FC Switch Module by providing a node address (N_Port ID) back to the FC Switch Module.

In yet further illustration, FIG. 3 is a flow chart illustrating a process for the fabric to respond to a request from a FC Switch Module by providing a node address (N_Port ID) back to the FC Switch Module. Beginning at Block 300 and leading into Block 301, the fabric 110 receives the ELS command with a FC Switch Module or a server ID. The FC Switch Module or server ID can be the World Wide (switch or server) number (WWN), or any other identification scheme to identify the switch or server to be associated with the N_Port address identification. At Block 302, it is determined if the command is a FLOGI command. If yes, at Block 303 an address table 116 is established in the name server 114 for the FC Switch Module N_Port 106. At Block 304, the first address identification is assigned for this N_Port 106. At Block 305, the address identification is recorded in the table 116, along with the FC Switch Module 104 or server identification, and other parameters needed for the communications protocol to be used to transfer commands and data between the N_Port 106 and the other network devices 120, 122 and/or 124. At Block 306, the address is returned to the N_Port 106.

In an embodiment, the original server 102 HBA port WWN can be propagated through the FC Switch Module so that the fabric can recognize the server exactly as it would if the server was physically connected directly into the fabric. Alternate name management mechanisms are possible, where the WWN presented to the fabric represents a logical entity that is independent of the specific HBA or server 102 hardware.

If the ELS is an FDISC command at Block 307, the next address is assigned or confirmed at Block 308. If a new source address identification is supplied by the FDISC ELS command, that address identification, if acceptable, is used. For example, the World Wide Port Number (WWPN) and World Wide Node Number (WWNN) are known for the FC Switch Module 104 or server 102 (e.g., a blade server HBA), and thus "real" HBA WWN identifiers are propagated through the switch to maintain a HBA's unique identity. If an address is not supplied, the next available address is assigned by fabric 110 in accordance with a desired scheme that insures that duplicate numbers are not assigned. In addition at Block 308, if the server ID already has an address identification in the table 116, the address identification is updated by the identification (ID) supplied in the FDISC ELS command.

Thus, the FDISC ELS command can be used to request an address be assigned, can have a proposed address identification confirmed, or can update an old address identification with a new address identification. Then at Block 305, the server identification, address identification, and other parameters are recorded in the address table 116, and at Block 306, the assigned, confirmed, or updated address identification is returned to the N_Port 106. It will now be understood that normal frame reception and transmission can begin. The controllers will see "n" different N_Port IDs, possibly one for the FC Switch Module port 106, and one for each server 102 that is connected through the FC Switch Module port 106.

In another embodiment, the FC Switch Module 104 can provide WWNN and WWPN assignments for the servers 102, and then use these WWNN and WWPN assignments as the server address IDs, which are supplied to the fabric 110 for address assignment (N_Port IDs). The NPIV Node mode is a customer selectable FC switch option and as such, NPIV is enabled or disabled on a per port basis, for each of the external ports. In general, when NPIV is enabled on a FC port, it will be one physical port with up to 15 separate "logical ports" associated with it, to represent the FC switch itself, and 14 server HBAs associated with it, for instance where the 14 blade HBAs are connected inside a blade server chassis 100. Of course, fewer or more servers may connect through an individual FC Switch Module port 106.

The system and methods described above, help to minimize switch interoperability impediments and management control risks, as well as provide multiple port addresses to a FC switch port directly from a storage area network (SAN) fabric and thereby expand the overall SAN network to allow the addition of more network devices without increasing the number of FC switches or increasing management control risks.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A data processing system configured for fibre channel communications comprising:

a plurality of server computing devices;

a fabric coupled to the server computing devices, the fabric comprising an active intelligent interconnection scheme for fibre channel architecture;

a fibre channel switch disposed between the server computing devices and the fabric, the switch comprising a node port for interconnection to a fabric port of the fabric and request handling logic, the request handling logic comprising program code enabled to send multiple requests to the fabric on behalf of respective ones of the plurality of server devices; and, a table coupled to the fabric and configured to store address identifications assigned by the fabric for each request provided by the request handling logic in the switch.

2. The data processing system of claim 1, wherein the table is stored in a name server.

3. The data processing system of claim 1, further comprising:

a server chassis coupled to each of the plurality of server computing devices.

4. The data processing system of claim 3, wherein the server chassis is further coupled to the switch.

5. An address assignment for a switch, the method comprising:

transmitting a request from a switch to a fabric, the request on behalf of a server computing device, wherein the switch includes a node port for interconnection to a fabric port of the fabric;

receiving an assigned address identification for the request from the fabric; and transmitting a proposed address to the fabric along with the request; and, receiving confirmation that the proposed address has been assigned to the server computing device.

6. The method of claim 5, wherein the proposed address is a world wide name (WWN).

7. The method of claim 5, further comprising:

coupling a server chassis to the switch.

8. An address assignment for a switch, the method comprising:

transmitting a request from a switch to a fabric, the request on behalf of a server computing device, wherein the switch includes a node port for interconnection to a fabric; port of the fabric;

receiving an assigned address identification for the request from the fabric; and transmitting an updated address to the fabric along with the request; and, receiving confirmation that the updated address has been assigned to the server computing device.

9. The method of claim 8, further comprising:

coupling a server chassis to a plurality of server computing devices.

10. A computer program product comprising a computer usable tangible medium having computer usable program code for address assignment for a switch, the computer program product including:

computer usable program code for transmitting a request from a switch to a fabric, the request on behalf of a server computing device, wherein the switch includes a node port for interconnection to a fabric port of the fabric;

computer usable program code for receiving an assigned address identification for the request from the fabric;

computer usable program for transmitting a proposed address to the fabric along with the request; and, computer usable program for receiving confirmation that the updated address has been assigned to the server computing device.

11. The computer program product of claim 10, further comprising:

computer usable program for coupling a server chassis to the switch.

12. A computer program product comprising a computer usable tangible medium having computer usable program code for address assignment for a switch, the computer program product including:

computer usable program code for transmitting a request from a switch to a fabric, the request on behalf of a server computing device, wherein the switch includes a node port for interconnection to a fabric port of the fabric;

computer usable program code for receiving an assigned address identification for the request from the fabric;

computer usable program for transmitting an updated address to the fabric along with the request; and, computer usable program for receiving confirmation that the updated address has been assigned to the server computing device.

13. The computer program product of claim 12, further comprising:

computer usable program for coupling a server chassis to the plurality of server computing devices.

* * * * *

UNITED STATES PATENT AND TRADEMARK OFFICE
CERTIFICATE OF CORRECTION

| | | |
|---|---|---|
| PATENT NO. | : 7,599,397 B2 | Page 1 of 1 |
| APPLICATION NO. | : 11/318971 | |
| DATED | : October 6, 2009 | |
| INVENTOR(S) | : William G. Holland | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Fourteenth Day of December, 2010

David J. Kappos
*Director of the United States Patent and Trademark Office*